United States Patent
Rosen

(10) Patent No.: US 12,218,623 B1
(45) Date of Patent: Feb. 4, 2025

(54) SYSTEMS AND METHODS FOR MULTI-POSITION SOLAR PANEL ARRAYS

(71) Applicant: DoubleLand LLC, Berkeley, CA (US)

(72) Inventor: Gregory Rosen, Berkeley, CA (US)

(73) Assignee: DoubleLand LLC, Berkeley, CA (US)

(*) Notice: Subject to any disclaimer, the term of this patent is extended or adjusted under 35 U.S.C. 154(b) by 0 days.

(21) Appl. No.: 18/778,561

(22) Filed: Jul. 19, 2024

(51) Int. Cl.
*H02S 20/30* (2014.01)

(52) U.S. Cl.
CPC .................. *H02S 20/30* (2014.12)

(58) Field of Classification Search
None
See application file for complete search history.

(56) References Cited

U.S. PATENT DOCUMENTS

| | | |
|---|---|---|
| 8,237,098 B2 | 8/2012 | Cabanillas Saldana |
| 8,876,026 B2 | 11/2014 | Pfrenger |
| 9,046,281 B2 | 6/2015 | Curran |
| 9,324,893 B1 | 4/2016 | Kats et al. |
| 9,559,232 B1 | 1/2017 | Naud et al. |
| 10,168,076 B2 | 1/2019 | Ornella et al. |
| 10,801,755 B1 | 10/2020 | Nemat et al. |
| 10,886,872 B1 | 1/2021 | Mah |
| 11,177,765 B1 | 11/2021 | Miller |
| 11,283,397 B2 | 3/2022 | Kunesh |
| 11,736,061 B2 | 8/2023 | Van Iseghem et al. |
| 11,866,887 B2 | 1/2024 | Eitelhuber et al. |
| 2010/0101559 A1 | 4/2010 | Grant et al. |
| 2010/0175741 A1 | 7/2010 | Thorne |
| 2010/0258110 A1 | 10/2010 | Krabbe et al. |
| 2010/0307479 A1 | 12/2010 | Park |
| 2011/0023864 A1 | 2/2011 | Andretich |
| 2011/0061644 A1 | 3/2011 | Pizzarello et al. |
| 2011/0194900 A1 | 8/2011 | French, Sr. |
| 2011/0284709 A1 | 11/2011 | Potter |
| 2012/0042936 A1 | 2/2012 | Feichtinger et al. |
| 2012/0158205 A1 | 6/2012 | Hinman et al. |
| 2013/0019925 A1* | 1/2013 | Britcher .................. H02S 20/30 136/251 |
| 2013/0037072 A1 | 2/2013 | Powell |
| 2013/0082637 A1 | 4/2013 | Eaton et al. |
| 2013/0186450 A1 | 7/2013 | Smith et al. |
| 2013/0340807 A1 | 12/2013 | Gerwing et al. |
| 2015/0107583 A1 | 4/2015 | Doyle |
| 2015/0207005 A1 | 7/2015 | Feng |
| 2017/0222475 A1 | 8/2017 | Van Straten |
| 2018/0083567 A1 | 3/2018 | Spisak |
| 2019/0028054 A1 | 1/2019 | Karkheck |
| 2020/0091863 A1* | 3/2020 | Angel .................. H02S 40/425 |
| 2021/0058022 A1* | 2/2021 | Forrest .................. B63B 35/44 |
| 2021/0075365 A1 | 3/2021 | Clapp et al. |

(Continued)

*Primary Examiner* — Jayne L Mershon

(74) *Attorney, Agent, or Firm* — Banner & Witcoff, Ltd.

(57) ABSTRACT

Aspects of this disclosure relate to multi-position solar panel arrays. Solar panel arrays may be configured for movement between regions that may allow for a dual use of land, such as for both agricultural production and electricity generation. Moveable frames may be configured for mounting solar panels to form a moveable solar panel array. A plurality of solar panel arrays may be configured for movement along rails between a first position and at least a second position, whereby the solar panel arrays may be arranged for solar power generation in each of these positions.

20 Claims, 8 Drawing Sheets

(56) References Cited

U.S. PATENT DOCUMENTS

| | | |
|---|---|---|
| 2021/0129873 A1* | 5/2021 | Cook ..................... B61D 43/00 |
| 2021/0320616 A1 | 10/2021 | El Safty |
| 2021/0328543 A1 | 10/2021 | Wentzel et al. |
| 2022/0140781 A1* | 5/2022 | Zhang ..................... H02J 3/381 |
| | | 136/243 |
| 2022/0151163 A1 | 5/2022 | Agrawal et al. |
| 2022/0256779 A1 | 8/2022 | Haastert et al. |
| 2022/0286083 A1 | 9/2022 | Leuck |
| 2023/0010589 A1 | 1/2023 | Eikelenboom |
| 2023/0231378 A1 | 7/2023 | Buttgenbach et al. |
| 2023/0268870 A1 | 8/2023 | Arab et al. |
| 2024/0039466 A1 | 2/2024 | Albertella |
| 2024/0079994 A1 | 3/2024 | Kennard |

* cited by examiner

SYSTEMS AND METHODS FOR MULTI-POSITION SOLAR PANEL ARRAYS

TECHNICAL FIELD

Aspects described herein generally relate to photovoltaic energy systems for generating electrical power using solar panels. More specifically, aspects described herein relate to adaptation technologies in agriculture, including renewable energy solutions for agricultural applications.

BACKGROUND

Solar panel systems are used in a variety of applications to generate electrical power. Power generated from solar panels and converted using related equipment, such as power optimizers, combiner boxes, and inverters, can be used locally at the place of generation, stored for future use with a battery, and/or supplied to the grid for use in other locations. Solar panels can be mounted onto the roof of a home or other building, or they can be installed on the ground such as in arrays. Agrivoltaic systems generally co-locate solar panel arrays with agricultural production, such that crops or livestock are located underneath or adjacent solar panels. Agrivoltaic systems are limited by a general inability to move solar panel arrays after installation, and as a result, land available for agricultural production is reduced with existing systems.

SUMMARY

The following presents a summary in order to provide a general understanding of various aspects of the disclosure. The summary is not an exhaustive overview of the disclosure and is not intended to limit the scope of any inventive concepts described herein.

Aspects of this disclosure relate to systems and methods for multi-position solar panel arrays. As described herein, solar panel arrays may be configured for movement between regions. The regions may include, but are not limited to, regions on a farm that may be used for growing crops and/or raising livestock. In addition to serving an agricultural purpose, the regions may serve a dual purpose of accommodating solar panel arrays for electrical power generation for at least some of the time. A plurality of solar panel arrays may be grouped and moved from a first region to a second region, or any number of regions, to allow for a dual use of land in a region for both agricultural production and electricity generation. For example, during a first time period that livestock are not grazing, a region may be covered by solar panel arrays; and, during a second time period that livestock are grazing, the solar panel arrays may be moved to another region to allow for such grazing. As another example, crops located in a first region and requiring a certain amount of sunlight may receive that sunlight while solar panel arrays are moved from the first region to a second region; and when the crops have received a sufficient amount of sunlight for a time period, the solar panel arrays may be moved back to the first region. As yet another example, when it is time to plant seeds in the first region and/or when crops are ready for harvesting in the first region, solar panel arrays located in the first region may be moved to the second region to allow for the planting of seeds and/or the harvesting of crops without having the solar panel arrays inhibit such processes. The multi-position solar panel arrangement described herein advantageously enables greater use of land for both agricultural production and electricity generation.

Systems and methods for multi-position solar panel arrays as described herein may comprise a plurality of solar panel arrays, rails for moving the solar panel arrays, and at least some electrical equipment that may be accessed from multiple regions to allow for the generation of electrical power via solar panel arrays from different regions. Rails may be installed on the ground and generally along the sides of the plurality of solar panel arrays. A length of the rails may be at least (and in some instances more than) twice a length of plurality of solar panel arrays, when the solar panel arrays are arranged in parallel for a solar power generation configuration, in order to facilitate movement of the solar panel arrays from/to a first region for a first solar power generation configuration to/from a second region (and/or any other number of regions) for a second (additional) solar power generation configuration. The solar panel arrays may comprise wheels and/or other moveable elements that may be configured to fit within the rails for moving the solar panel arrays between the regions with minimal or no negative impact on land covered by the solar panel arrays, adjacent land, and/or surrounding land. The wheels or other moveable elements may comprise a locking mechanism to prevent movement of the solar panel arrays during use when the wheels and/or other moveable elements are locked, and to allow movement of the solar panel arrays between regions when the wheels or other moveable elements are unlocked. One or more mechanisms may be used to further facilitate movement of the solar panel arrays, such as a handle, tractor pull, motor, gear(s), pulley(s), cable(s), and the like. The multi-position solar panel array systems and methods described herein provide a plurality of solar panel arrays in a solar power system that may be easily and quickly relocated between a plurality of regions.

These features and other features are described in greater detail below.

BRIEF DESCRIPTION OF THE DRAWINGS

The present disclosure is shown by way of example figures, listed below, in which like reference numerals indicate similar elements.

DETAILED DESCRIPTION

In the following detailed description, reference is made to the accompanying drawings, which form a part hereof, and in which is shown, by way of example, various embodiments in which aspects of the disclosure may be implemented. It is to be understood that other embodiments may be used, and structural and functional modifications may be made, without departing from the scope of the present disclosure. It is noted that various connections between elements are discussed in the following description. It is also noted that these connections are general and, unless specified otherwise, may be direct or indirect, wired or wireless, and that the specification is not intended to be limiting in this respect. In general, reference to connections herein that relate to power may be connections made via one or more wires, cables, conduits, and/or electrical connectors, not all of which may be shown in drawings but which would be readily understood by a person of ordinary skill in the art. The examples and arrangements described are merely some example arrangements in which the systems and methods described herein may be used. Various other arrangements employing aspects described herein may be used without departing from the invention.

As described above, agrivoltaic systems have been limited by a general inability to quickly and easily move solar panel arrays after installation. As a result, land available for agricultural production has been reduced with such systems. The present invention overcomes these deficiencies by providing methods, devices, and systems for multi-position solar panel arrays that are configured for solar power generation operation in multiple regions and that are configured for movement between those regions.

Figure 1:
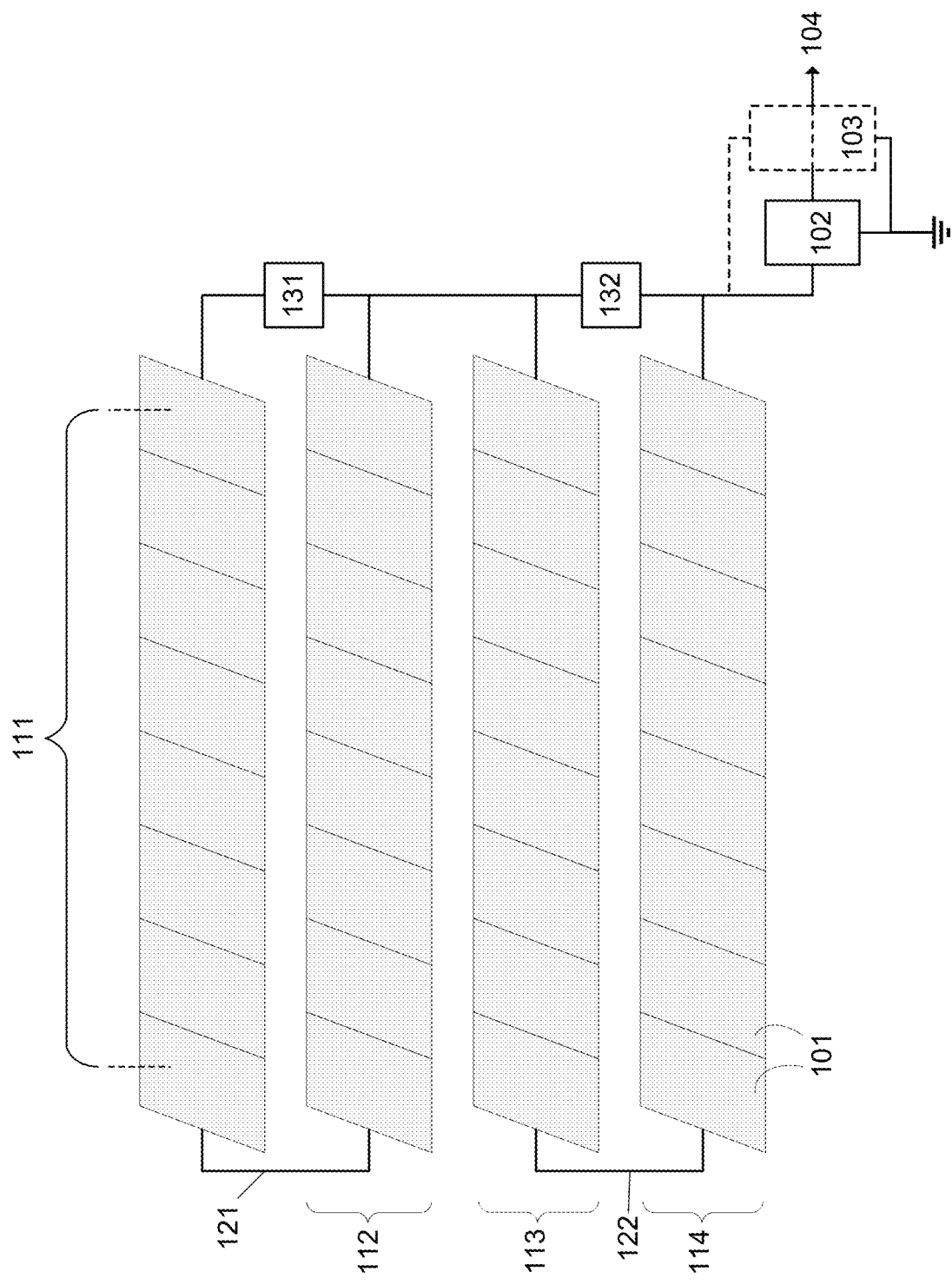
FIG. 1 shows an example of a solar power system for use in a multi-position solar panel array system.

FIG. 1 shows an example of a solar power system. A solar power system 100 may comprise a plurality of solar panel arrays 111. Each solar panel array 111 may comprise a plurality of solar panels 101. Each solar panel 101 may comprise a plurality of solar cells (not shown) that may be used to convert sunlight into electrical power. While the solar panels 101 are shown as having a generally rectangular shape (e.g., from an angled view so as to otherwise appear to take a parallelogram shape), the solar panels 101 may comprise any shape, such as a rectangle, square, hexagon, etc. Each solar panel array 111 may be mounted on a frame or other mounting structure (not shown in FIG. 1), described and shown in further detail herein. The solar panels 101 may comprise a translucent material, such as in backless solar panels, which may enable growth of certain plants (e.g., cover crops) beneath the solar panels 101. As described herein, the frame (not shown) may comprise a moveable frame that may enable movement of the solar panel array 111 to/from different regions for solar power generation operation. Each solar panel array 111, and/or each solar panel 101 within a solar panel array 111, may be rotatable (e.g., per solar panel 101 and/or per solar panel array 111) along the frame, which may enable increased solar power generation such as by tracking (e.g., manually or automatically) the movement of the sun over the course of a day to help maintain positioning of the solar panels 111 relative to the sun in an effort to maximize electrical production.

One or more solar panels 101 may be coupled to a power optimizer (not shown), or other electrical equipment, that may be mounted on the underside of the respective panel(s) or on an adjacent structure upon which the respective panel(s) may be mounted, and that may operate to deliver a desired power level. For example, each solar panel 101 may generate different amounts of electrical power based on various factors such as relative positioning, angle, amount of sun exposure and/or shading, and/or physical characteristics of the panel. A power optimizer may operate as a direct current (DC)-to-DC converter for the solar panel(s) 101 by using maximum power point tracking (MPPT) across a plurality of panels to monitor and adjust DC characteristics of each panel in a manner that may help maximize overall energy output of a plurality of solar panels 101.

While FIG. 1 shows four sets of solar panel arrays 111, 112, 113, and 114, the solar power system 100 may comprise any quantity of solar panel arrays 111 (e.g., less than four—such as one, two, or three—or more than four—such as six, twelve, twenty-four, one-hundred, one-thousand, etc.). For clarity, element number 111 is used interchangeably herein to refer to a solar panel array in the singular form and in the plural form, depending on context within the description. For example, in the singular form, the solar panel array 111 may be one of a plurality of solar panel arrays that also includes solar panel array 112, solar panel array 113, and/or solar panel array 114. In this singular form, reference to one or more features of the solar panel array 111 may apply similarly to each of the other solar panel arrays in the solar power system 100 (e.g., each of the solar panel arrays 112, 113, and/or 114). In the plural form, each of the solar panel arrays of the solar power system 100 may be referred to collectively as a plurality of solar panel arrays 111 (e.g., comprising all of solar panel arrays 111, 112, 113, and 114).

While FIG. 1 shows eight solar panels 101 in each solar panel array 111, any of the solar panel arrays 111 may comprise any quantity of solar panels 101 (e.g., less than eight—such as two, three, four, etc.—or more than eight—such as ten, twelve, twenty-four, one-hundred, one-thousand, etc.). One or more solar panel arrays 111 may comprise the same quantity of solar panels 101, or a different quantity of solar panels 101, as any of the other solar panel arrays 111.

Solar panel arrays 111 may be connected in series or in parallel via one or more connections. For example, solar panel array 111 may be coupled to solar panel array 112 via a connection 121 and/or via a connection element 131. A connection element 131 may comprise one or more of a disconnect, a combiner box, and/or other electrical equipment. Solar panel array 113 may be coupled to solar panel array 114 via a connection 122 and/or via a connection element 132. A connection element 132 may comprise one or more of a disconnect, a combiner box, and/or other electrical equipment. A plurality of solar panels 101 in a solar panel array 111 may be grouped as a string of solar panels. A string of solar panels may be coupled to other solar panels, for example, via an AC disconnect, a DC disconnect, and/or any combination of disconnects. A solar panel array 111 may comprise any combination of rows of solar panels. For example, while FIG. 1 shows a single row of solar panels as a solar panel array 111, the solar panel array 111 may comprise more than one row of solar panels (e.g., two, three, four, or as many rows as may be included in the solar power system 100.

The connection(s) 121 and/or 122 may comprise electrical wiring, cables, and/or electrical conduit through which electrical wire(s)/cable(s) may pass. The connection elements 131 and/or 132 may comprise one or more electrical components that may be used to combine the electrical output of a plurality of solar panels 101 into a combined electrical output. The one or more electrical components may comprise, for example, one or more circuit breakers such as DC molded case circuit breakers (MCCB), one or more fuses such as photovoltaic (PV) string fuses, one or more electrical junctions for coupling wiring/cabling, and the like. The connection elements 131 and/or 132 may be mounted on a frame (not shown) of the solar panel array 111. Output(s) of the connection elements 131 and/or 132 may provide the combined electrical output of the solar panels 101 into an inverter 102. The inverter 102 may convert the combined electrical output of the solar panels 101 from DC into alternating current (AC). For example, an output 104 of the inverter 102 may comprise 120 volts (V) AC and/or 240 VAC. Optionally, the solar power system 100 may comprise a battery 103, such as a battery energy storage system (BESS). The battery 103 may use AC coupling and/or DC coupling to store power and provide electricity at a later time, such as during a time that the solar panels 101 may not be generating electricity (e.g., during evening, weather events, power outage, etc.). For example, the battery 103 may use DC coupling by storing power in the form of DC received from the combined electrical output from the connection elements 131 and/or 132 (e.g., as shown in dashed line output from the connection elements 131 and/or 132 and input to the battery 103). Additionally or alternatively, the battery 103 may use AC coupling by storing power received from the inverter 102 (e.g., in AC) after converting the AC back to DC for storage. The battery 103 may optionally comprise an inverter for converting DC power to AC (e.g., in an AC coupling configuration) to provide the output 104 of the solar power system 100. While the solar power system 100 is shown in a configuration using the inverter 102 as a central inverter, additionally or alternatively, one or more microinverters (not shown) may be used in the solar panel system 100, such as in place of the inverter 102 (e.g., which may be replaced by a large combiner box combined with the one or more microinverters). Additionally or alternatively, the inverter 102 may comprise a plurality of inverters that may be spaced apart from each other, such as to be closer to a particular one or more location, as described further herein.

Figure 2A:
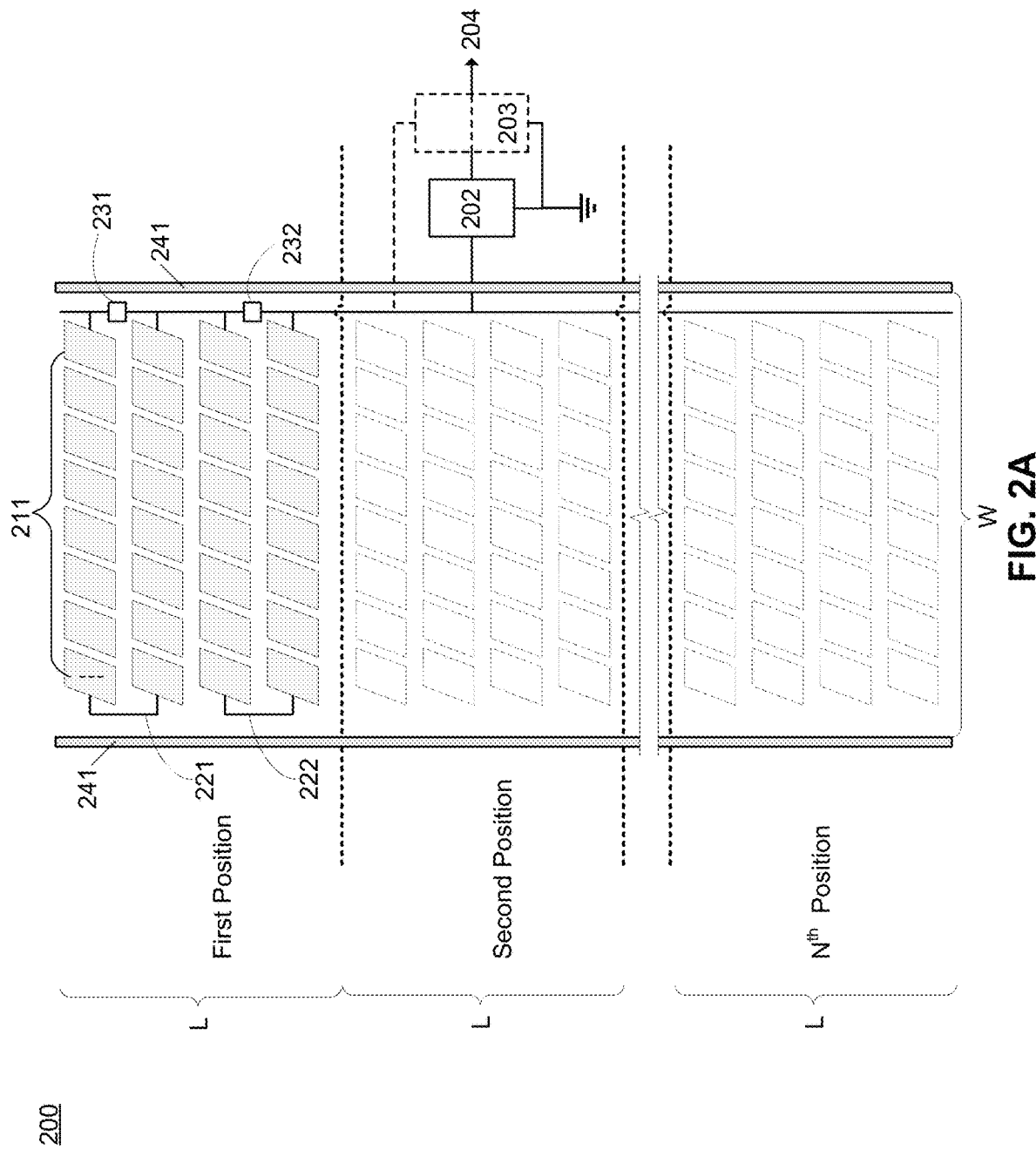
FIG. 2A shows an example of a multi-position solar panel array system with solar panel arrays located in a first position.
Figure 2B:
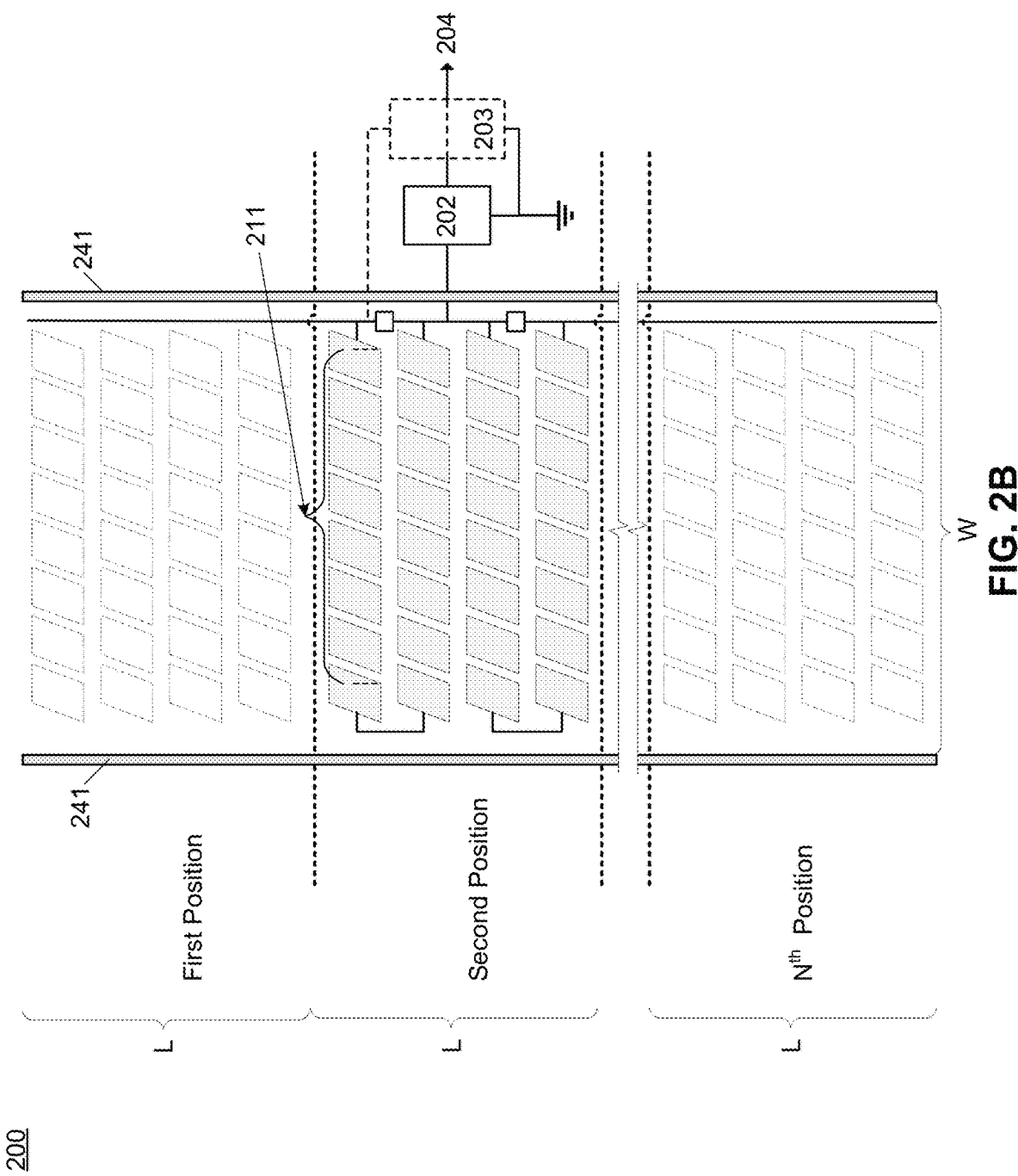
FIG. 2B shows an example of a multi-position solar panel array system with solar panel arrays located in a second position.
Figure 2C:
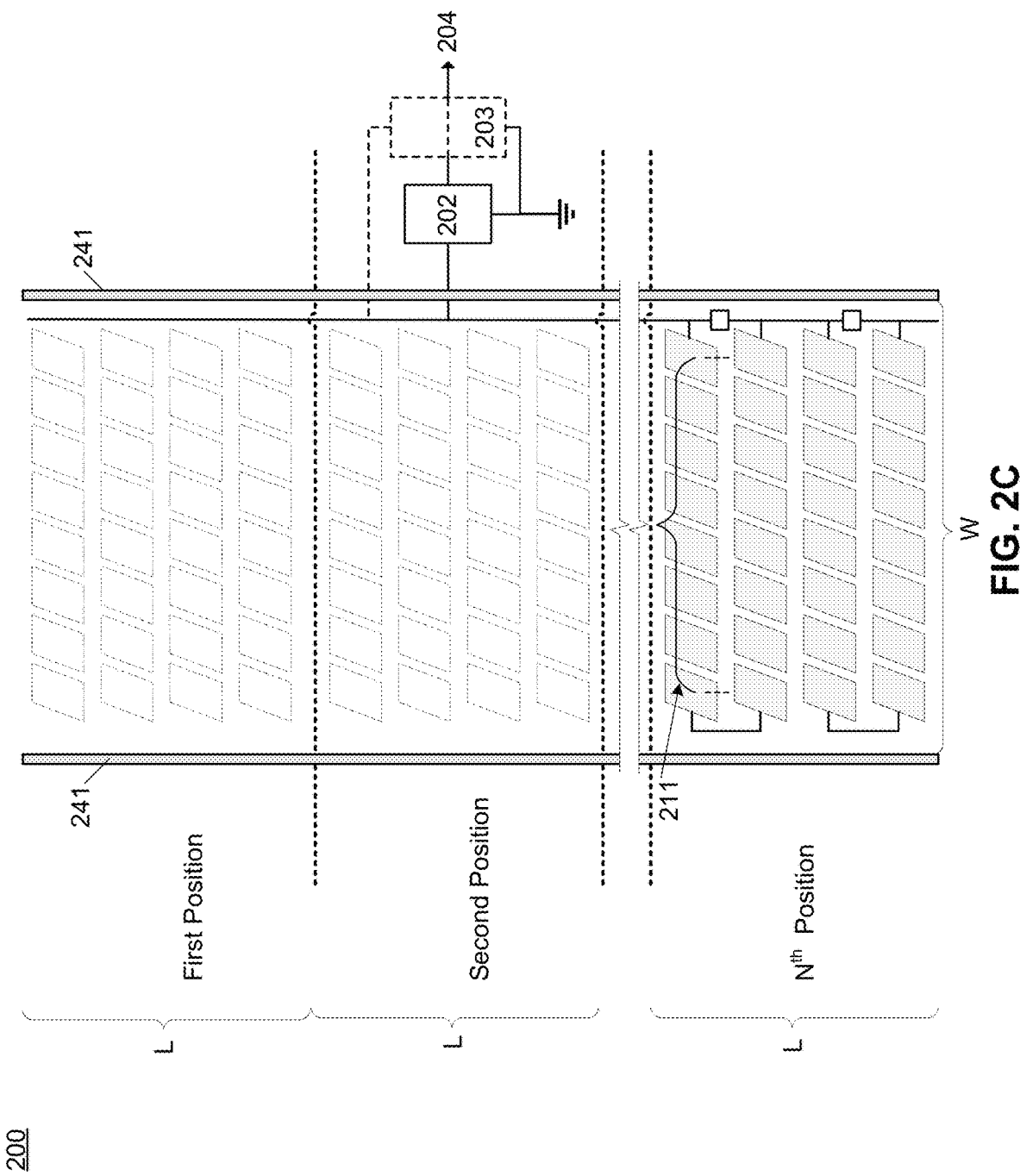
FIG. 2C shows an example of a multi-position solar panel array system with solar panel arrays located in an $N^{th}$ position.

FIG. 2A, FIG. 2B, and FIG. 2C each show examples of a multi-position solar panel array system. FIG. 2A shows an example of a multi-position solar panel array system 200 comprising solar panel arrays 211 located in a first position. As used herein, a "position" of a solar panel array 211 and/or of a plurality of solar panel arrays 211 may refer to a "region" and/or an "area" in which the solar panel arrays 211 are located to generate electrical power (e.g., a solar power generation configuration). FIG. 2B shows an example of the multi-position solar panel array system 200 with solar panel arrays 211 located in a second position. FIG. 2C shows an example of the multi-position solar panel array system 200 with solar panel arrays 211 located in an $N^{th}$ position, where N may be any whole number greater than or equal to two. FIG. 2A, FIG. 2B, and FIG. 2C may be collectively referred to herein as "FIG. 2" for ease of reference. As shown in FIG. 2, the first position, second position, and/or the $N^{th}$ position may be mutually exclusive such that neither of the respective regions/areas of these positions may overlap with a region/area of any other of these positions. Such a system with non-overlapping regions/areas may allow for all or substantially all of the area in a position (e.g., the first position) to be uncovered. As a result, area of a position (e.g., the first position) may be fully or substantially fully available to receive sunlight when the plurality of solar panel arrays 211 are moved to another position (e.g., the second position and/or the $N^{th}$ position). Additionally, area of a position (e.g., the first position) may be fully or substantially fully available for unfettered access to the land, such as for access to machinery of any height (e.g., tractors, combines, etc.), livestock of any height (e.g., longhorn cattle, sheep, goats, etc.), and people (e.g., farm workers) when the plurality of solar panel arrays 211 are moved to another position (e.g., the second position and/or the $N^{th}$ position). Area of any other position similarly may be fully or substantially fully available to receive sunlight and/or to provide unfettered access to land when the plurality of solar panel arrays 211 are moved to another position.

As shown in FIG. 2A, the multi-position solar panel array system 200 may comprise a plurality of solar panel arrays 211 that may be arranged for solar power generation in a first position, and that may be moveable along rails 241 to at least a second position (and/or up to an $N^{th}$ position) for solar power generation. As shown in FIGS. 2A, 2B, and 2C, each of the first position and the second position (and/or up to the $N^{th}$ position) comprises a two-dimensional area sufficient to fit the plurality of solar panel arrays 211 in a configuration sufficient for solar power generation. As described herein, being in a configuration sufficient for solar power generation corresponds to the solar panel arrays 211 being arranged so as to accommodate potentially being exposed to the sun (e.g., if the sun were to be present) in order to generate electrical power. Being in a solar power generation configuration is in contrast to being arranged in a position for storage, such as with at least some solar panels covering surface area of other solar panels in a manner that may reduce overall surface area of the solar panel arrays and/or that may reduce overall storage space (e.g., while potentially sacrificing power generation of at least some solar panels). In FIG. 2A, the solar panel arrays 211 are shown with shading in the first position to indicate that the solar panel arrays 211 are located in the first position in this example of FIG. 2. The second position and the $N^{th}$ position are shown in FIG. 2A with dashed outlines of solar panel arrays to show that, when the solar panel arrays 211 are moved to those respective positions, they can accommodate the solar panel arrays in a configuration sufficient for solar power generation (e.g., sufficient length, width, panel area, panel spacing, array spacing, etc.).

FIG. 2B shows the solar panel arrays 211 in the second position. For example, the solar panel arrays 211 may be moved from the first position (such as shown in FIG. 2A) to the second position (such as shown in FIG. 2B). As shown in this second position, the solar panel arrays 211 are arranged for solar power generation. The solar panel arrays 211 are shown with shading in the second position to indicate that the solar panel arrays 211 are located in the second position in this example of FIG. 2B. The first position and the $N^{th}$ position are shown in FIG. 2B with dashed outlines of solar panel arrays to show that, when the solar panel arrays 211 are moved to those respective positions, they can also accommodate the solar panel arrays in a configuration sufficient for solar power generation.

FIG. 2C shows the solar panel arrays 211 in the $N^{th}$ position where N may be any whole number greater than or equal to two. In an example where N equals two, the solar power system 200 would accommodate solar power generation in the first position (such as shown in FIG. 2A) or solar power generation in the second position (such as shown in FIG. 2B). In an example where N equals more than three, additional positions may be included in between the second position and the $N^{th}$ position, each of which may accommodate solar power generation by the solar panel arrays 211. For example, the solar panel arrays 211 may be moved from/to the first position (such as shown in FIG. 2A) or the second position (such as shown in FIG. 2B) to/from the $N^{th}$ position (such as shown in FIG. 2C). As shown in this $N^{th}$ position, the solar panel arrays 211 are arranged for solar power generation. The solar panel arrays 211 are shown with shading in the $N^{th}$ position to indicate that the solar panel arrays 211 are located in the $N^{th}$ position in this example of FIG. 2C. The first position and the second position are shown in FIG. 2C with dashed outlines of solar panel arrays to show that, when the solar panel arrays 211 are moved to those respective positions, they can also accommodate the solar panel arrays in a configuration sufficient for solar power generation.

With respect to FIGS. 2A, 2B, and 2C, the plurality of solar panel arrays 211 may correspond to the solar panel arrays 111 described with respect to FIG. 1. Any of the features described with respect to the solar panel system 100 described with respect to FIG. 1 may correspond to elements in the solar panel system 200. For example, inverter 102, battery 103, and/or output 104 in the solar power system 100 may correspond to similarly numbered inverter 202, battery 203, and/or power output 204 in the solar power system 200, and descriptions of such elements and/or features regarding FIG. 1 are incorporated by reference here in the solar power system 200 of FIGS. 2A, 2B, and 2C. Similarly, the solar panel arrays 211 may be connected in series or in parallel via one or more connections 221 and/or 222, via one or more connection elements 231 and/or 232, and/or via other electrical equipment, such as described with respect to the connections 121 and/or 122, the connection elements 131 and/or 132, and/or the other electrical equipment in FIG. 1, incorporated by reference here in the solar power system 200 of FIGS. 2A, 2B, and 2C. At least some of the connections may comprise conduit (e.g., electrical conduit) and/or electrical wiring. The conduit may surround electrical wiring. For example, one or more wires and/or cables may be placed within the conduit. Additionally or alternatively, at least some of the connections may comprise electrical wiring without conduit, such as wiring that may be at least partially exposed and/or that may be buried under ground. For example, off-array wiring may be used that may be buried underground or that may otherwise be inaccessible at the location of the solar panel system 200. Electrical wiring may enable the flow of electricity from components of the solar panel system 200 to the power output 204. The conduit may comprise underground electrical conduit and/or aboveground electrical conduit. For example, a main combiner box, such as the connection element 232, may be coupled to the inverter 202 via conduit (e.g., underground electrical conduit). The conduit may be installed underneath (e.g., underground electrical conduit) or adjacent (e.g., parallel to, such as in above ground conduit) at least one of the rails 241 (e.g., the rail 241 closest to the inverter 202). The conduit may extend approximately as long as the rails 241, or at least as long as a distance between a location of a main combiner box when the main combiner box is located at the first portion and a location of the main combiner box when the main combiner box is located at the $N^{th}$ portion. In at least some examples, the inverter 202 may be located at a fixed position. Conduit may be coupled (or couplable) to the inverter 202 at fixed positions that may comprise: at least a portion of conduit coupled to one or more connection elements (e.g., 231 and/or 232) at a first position, and at least a portion of conduit coupled (or couplable) to one or more connection elements (e.g., 231 and/or 232) at a second position (or at an $N^{th}$ position).

Wiring/cables/connector(s) that couple the inverter 202 to a main connection element (e.g., connection element 232) may be disconnected to allow movement of the solar panel arrays 211 to a different position (e.g., first/second/$N^{th}$ position). Wiring/cables/connector(s) may be recoupled to the inverter 202 after movement of the plurality of solar panel arrays 211 to the different position. In this manner, the one or more connection elements (e.g., 231 and/or 232), including the main connection element, may move along with the plurality of solar panel arrays 211, whereas the inverter 202 may remain stationary. In at least some examples, one or more connection elements may be stationary. For example, one or more stationary connection elements may be coupled/decoupled to the solar panel arrays 211 after/before movement of the solar panel arrays. The inverter 202 may be located at a fixed location, approximately in between the first position and the $N^{th}$ position (or the second position if N equals two), and may be coupled to an electric utility grid and/or a home/building that may use electricity generated by the solar power system 200 at the power output 204. As described herein, power may be transferred from a main connection element to the inverter 202 within electrical conduit (e.g., underground electrical conduit) which may provide increase safety around the solar power system 200, for example, by reducing potential exposure of humans and/or animals to potentially dangerous levels of power. Such a configuration may additionally facilitate movement of the plurality of solar panel arrays 211 between the first/second/$N^{th}$ positions, for example, by avoiding a need to include excess wiring/cables above ground that corresponds to the length of the rails 241. As described further herein, the solar panel array system 200 may cover land comprising any amount of area, and the coverage of the solar panel array system may be extended to any additional size, for example, by extending the rails 241 and adding additional electrical conduit to couple the inverter 202 to a main connection element at its further location from the inverter 202. Additionally or alternatively, while shown as a single inverter in the system 200, the inverter 202 may comprise a plurality of inverters. In such a system comprising a plurality of inverters as the inverter 202, an inverter may be located adjacent and/or nearby one or more positions of the system 200. For example, an inverter may be located within or nearby a plurality of (e.g., each of) the first, second, and/or $N^{th}$ positions. Additional electrical equipment may be included in the system 200, such as fuses, transformers, switches, and the like, to facilitate safe and reliable transfer and conversion of electrical power from the solar panels of the solar panel arrays 211 to the power output 204.

The plurality of solar panel arrays 211 may comprise any quantity of solar panel arrays. Any of the plurality of solar panel arrays 211 may comprise any quantity of solar panels, such as the solar panels 101 described with respect to FIG. 1 incorporated by reference here in the solar power system 200 of FIGS. 2A, 2B, and 2C. At least some solar panels in the plurality of solar panel arrays 211 may be spaced apart from an adjacent solar panel within an array of solar panels, such as shown in FIGS. 2A, 2B, and 2C, or may be placed adjacent to another solar panel without a noticeable space/gap between the solar panels such as shown in FIG. 1. The plurality of solar panel arrays 211 may be moved one array at a time, multiple arrays at a time, and/or all of the plurality of solar panel arrays 211 together. For example, a plurality of rows of solar panels and/or solar panel arrays may be coupled in a fixed manner (e.g., permanently joined together) so as to form a solar panel array 211 that may comprise a plurality of rows of solar panels that may all remain together (e.g., remaining together during movement between positions and/or before/after movement between positions).

Rails 241 may facilitate movement of the plurality of solar panel arrays 211 between the first position, the second position, and/or the $N^{th}$ position. Each of the plurality of solar panel arrays 211 may comprise a plurality of solar panels 101 mounted on a moveable frame (not shown in FIG. 2), described and shown further herein. The moveable frame may be mounted on the rails 241. For example, one or more wheels and/or other friction reducing element(s) may be installed on a bottom portion of the moveable frame at a location of the rails (e.g., at a left end and at a right end of the moveable frame). The moveable frame may have a width (W), shown in each of FIGS. 2A, 2B, and 2C as corresponding to the width of each solar panel array 211. The width W may be determined by any combination of: a land area available for solar power generation, a quantity of solar panels desired for a solar panel array (e.g., based on a quantity of solar power generation desired), a size (e.g., width) of each solar panel of the solar panel array, a (desired) spacing between each solar panel of the solar panel array 211, and/or spacing requirements for use of and/or access to land in between the rails 241 such as width(s) of various agricultural equipment and/or capability/ies of equipment such as a turning radius and/or whether equipment may have a reverse gear. When the plurality of solar panel arrays 211 are arranged sufficiently spaced apart for a solar panel production configuration, the plurality of solar panel arrays 211 may have a collective length (L), shown in each of FIGS. 2A, 2B, and 2C as corresponding to the collective length of the solar panel arrays 211. The length L may be determined by any combination of: a land area available for solar power generation, a quantity of solar panel arrays 211 desired (e.g., based on a quantity of solar power generation desired), and/or a (desired) spacing between each solar panel array 211 (e.g., based on land use requirements, such as optimal spacing for crop growth, equipment access, etc.). For example, if land collectively available for solar power generation and agricultural use is three acres long, the length L may be one acre long (where N equals 3), one-and-a-half acres long (where N equals two), and/or any other length that may correspond to a quantity of solar power generation positions desired for the land.

When the plurality of solar panel arrays 211 are arranged sufficiently spaced apart for a solar panel production configuration, the solar panel arrays 211 may cover a two-dimensional region (e.g., a portion of land) having an area (A) corresponding to W×L. The solar panel arrays 211 may cover an area the size of area A in each of the first position, second position, and $N^{th}$ position. Accordingly, the rails 241 may comprise a length of at least twice as long as L. For example, if the solar power system 200 comprises two positions (e.g., the first position and the second position, where N equals two), then the length of the rails 241 may comprise a length of at least 2L. As another example, if the solar power system 200 comprises three positions (e.g., if N equals three), then the length of the rails may comprise a length of at least 3L (e.g., or at least N×L, for any other number N of positions). Rails 241 may be located parallel relative to each other, for example, to facilitate linear movement of the solar panel arrays 211. While two rails 241 are shown in FIGS. 2A, 2B, and 2C, any quantity of rails may be used with the solar power system 200 (e.g., three rails, four rails, five rails, etc.). For example, if two rails 241 are used, they may be located at opposite ends of the width (W) of the solar panel arrays 211. As another example, if three/four/five rails are used, a third/fourth/fifth rail (not shown) may be located in between the two rails 241 shown that are located at opposite ends of the width (W) of the solar panel arrays 211. Rails 241 may be spaced apart by a sufficient distance to accommodate various equipment (e.g., farming equipment such as tractors, harvesters, plows, etc.) passing in between the rails 241, such as in a direction parallel to the rails 241. Rails 241 may be installed to be parallel to each other so as to permit only linear movement of the solar panel arrays 211.

Rails may be installed in the ground using one or more securing mechanisms. For example, the rails 241 may be bolted in a manner similar to railroad ties. Additionally or alternatively, rails 241 may be hammered into the soil. Additionally or alternatively, rails may be secured via concrete, rebar, screws, bolts/nuts, ground posts, weighted ballasts, and/or any combination thereof. Row length (e.g., corresponding to width W) may be configurable on site, for example, to cover any area that is desired for solar power generation and some other land use. While rails 241 may be installed for long-term and/or permanent placement, the use of rails 241 to enable movement of the solar panel arrays 211 may enable movement of the solar panel arrays 211 without damage and/or with minimal or no negative impact to land. For example, a solar power system that may be mobilized with wheels but without the benefit of a rail system as described herein may damage land (e.g., destroy crops, damage grass, leave tracks, etc.) due to the relatively heavy nature of solar panel arrays and related equipment. However, by using rails 241 as described herein, land between the rails 241 and land outside of the rails 241 (e.g., to the left of the left-most rail 241 and/or to the right of the right-most rail 241) may be undisturbed by the movement of solar panel arrays 241. As a result, systems and methods described herein may provide advantages of a flexible solar power generation system having minimal or no negative impact on land caused by movement of solar panel arrays.

By arranging the rails 241 in the manner described herein, land covering each of the various positions (e.g., first position, second position, $N^{th}$ position) may be used for agricultural purposes (e.g., crops, livestock, etc.) in a manner similar to its use prior to an installation of the solar power system 200. For example, when the solar panel arrays 211 are located in the first position in a solar power generation configuration, land in the second position (and through the $N^h$ position) may be used for agricultural purposes without being obstructed by solar panels. Similarly, when the solar panel arrays 211 are located in the second position in a solar power generation configuration, land in the first position (and in the $N^h$ position, including any land in between the second position and the $N^h$ position) may be used for agricultural purposes without being obstructed by solar panels.

In addition to enabling a dual-purpose of land for both solar power generation and agricultural use, the systems and methods described herein may provide additional advantages such as improved case of maintenance and compliance with zoning requirements. For example, by enabling the length-wise spacing between the solar panel arrays 211 to be flexible, via movement of the solar panel arrays 211 on a per-array basis, solar panel arrays 211 that are moveable between positions may enable improved access to solar panels on a solar panel array 211, such as for repair and/or replacement of a solar panel and/or related equipment (e.g., power optimizer(s), microinverter(s), wiring/cables, combiner boxes, fuses, circuit breakers, etc.), by moving the solar panel array 211 requiring service to a location away from other solar panel arrays during the time of servicing/repairing. As another example, solar panel arrays 211 that are moveable between positions may enable a greater area of land to be used for solar power generation while maintaining compliance with various zoning and/or ordinance requirements that may otherwise restrict solar panel coverage of land, such as by limiting a percentage and/or a total quantity of land to be covered at any given time with solar panels. The flexible systems and methods described herein may more easily enable compliance with such zoning and/or ordinance requirements while also maximizing land use such as for the dual-purpose of land for both solar power generation and agricultural use.

Figure 3:
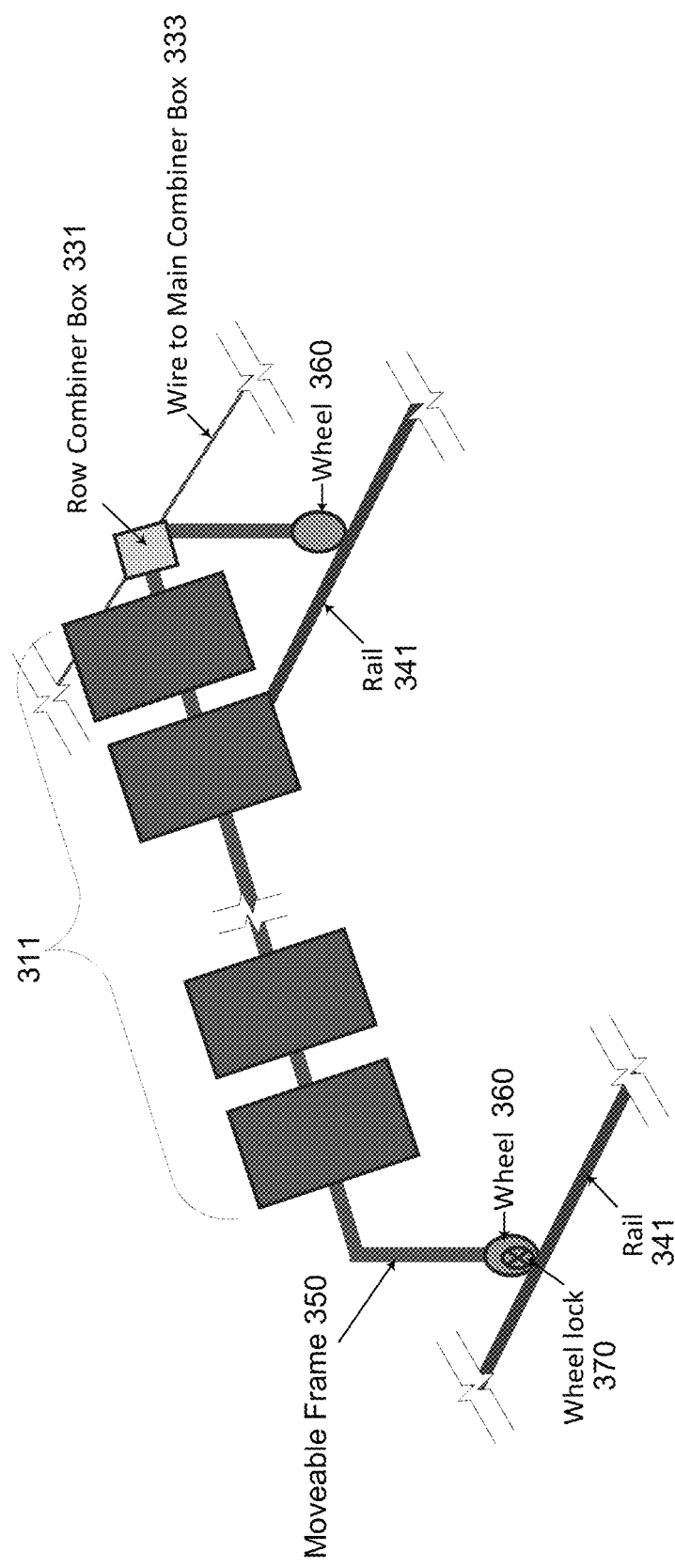
FIG. 3 shows an example of a solar panel array of a multi-position solar panel array system.

FIG. 3 shows an example of a solar panel array of a multi-position solar panel array system, such as system 200 of FIG. 2. A solar panel array 311 may be configured to be moveable between a plurality of locations. The solar panel array 311 in FIG. 3 may correspond to a solar panel array of the plurality of solar panel arrays 211 described with respect to FIGS. 2A, 2B, and 2C. Any of the features with respect to the solar panel system 100 described and/or shown with respect to FIG. 1, and/or with respect to the solar panel system 200 described and/or shown with respect to FIGS. 2A, 2B, and 2C, may correspond to elements of FIG. 3. For example, rails 341 in FIG. 3 may correspond to the rails 241 described with respect to FIGS. 2A, 2B, and 2C. Row connection element 331 may correspond to the connection element 131 and/or the connection element 132 described with respect to FIG. 1, and/or the connection element 231 and/or the connection element 232 described with respect to FIG. 2. Connection 333, shown as one or more wires to a main connection element in FIG. 3, may correspond to connections to the connection element and/or connections to the inverter 202 and/or battery 203 shown and described with respect to FIGS. 2A, 2B, and 2C. Moveable frame 350 may correspond to the moveable frame described (but not shown) with respect to FIGS. 1, 2A, 2B, and 2C.

The moveable frame 350 may comprise one or more wheels 360. The one or more wheels 360 may correspond to the one or more wheels and/or friction reducing element(s) described (but not shown) with respect to FIGS. 1, 2A, 2B, and 2C. One or more of the wheels 360 may comprise a wheel lock 370 and/or movement resistive element. The wheel lock 370 may be configured to resist movement of the moveable frame 350, for example, when the wheel lock 370 is engaged. The wheel lock 370 may be configured to disable resistance of movement of the moveable frame 350, for example, when the wheel lock 370 is disengaged. The wheels 360 may facilitate movement of the solar panel array 311 along the rails 341 (e.g., forward or backward) between different locations for solar power generation, such as described with respect to the system 200 in FIG. 2. For example, the solar panel array 311 may be moved (either separately or in combination with movement of a plurality of solar panel arrays) to be located in the first position, the second position, or the $N^{th}$ position, as described with respect to FIGS. 2A, 2B, and 2C regarding the plurality of solar panel arrays 211. Each solar panel array 311 may be moved, for example, after unlocking its respective wheel(s) 360 by disengaging its wheel lock(s) 370, and disconnecting all wiring/cables that couple the respective solar panel array 311 to a respective row connection element 331 (e.g., as shown at element 333 as a wire coupling the connection element 331 to an inverter such as the inverter 202).

As shown in FIG. 3, the solar panel array 311 may comprise any quantity of solar panels. Four solar panels are shown in FIG. 3, with two pairs separated by a break symbol to indicate that any quantity of additional solar panels may be included in between the two shown pairs of solar panels. That is, the solar panel array 311 may comprise fewer than, or greater than, the four solar panels shown in FIG. 3. The solar panels of the solar panel array 311 may be mounted on a moveable frame 350 of the solar panel array 311. Solar panel configurations for the solar panel array 311 may be customized based on site requirements. For example, solar panel configurations may range from completely horizontal (e.g., zero degree tilt), a 15-degree title angle, a 20-degree tilt angle, and/or a 30-degree tilt angle (or any other tilt angle). Additionally or alternatively, the solar panel array 311 may have its solar panels configured as trackers (e.g., facing east in the morning and slowly rotating west over the course of the day to track the location of the sun). Solar panels in the solar panel array 311 may be spaced anywhere relative to each other, such as from less than an inch apart to one or more feet apart (or any other distance), for example, to allow for structural considerations such as wind load, and/or to accommodate the total amount of direct sunlight that may fall on the land beneath the panels (e.g., to help enable certain crop and/or grass/feed growth).

In addition to wheels 360, or in the alternative to wheels 360, the moveable frame 350 described with respect to FIG. 3 may comprise one or more friction reducing elements for facilitating movement of a plurality of solar panel arrays (e.g., 211, 311) between a first two-dimensional region (e.g., first position) and at least a second two-dimensional region (e.g., second position and/or $N^{th}$ position). In at least some examples, the friction reducing element(s) may comprise the wheels 360. The wheels 360 may comprise sliding brackets (e.g., similar in style as moveable filing or utility/tool cabinets), ball bearings, and/or the like. In at least some other examples, the friction reducing element(s) may comprise at least one of a bearing and/or a chain that may be coupled to one or more gears. Any other configuration and/or feature may be implemented as the one or more friction reducing elements to facilitate movement of the plurality of solar panel arrays (e.g., 211, 311).

The moveable frame 350 may comprise any shape. For example, while the moveable frame 350 is shown in FIG. 3 as generally comprising three linear portions (e.g., one long portion upon which the panels are mounted, and two side portions extending downward toward respective rails 341), the moveable frame 350 may comprise additional or alternate portions, such as sides with cross-sections resembling an upside-down V-frame, an upside-down U-frame, or an A-frame, with wheels 360 on the bottom of two legs on both sides of the moveable frame 350, and/or truss-like structures along the width of the moveable frame 350 and/or at the sides of the moveable frame which may provide support for the weight of the solar panels. Additionally or alternatively, the moveable frame 350 may be configured to accommodate solar panels on two sides, and/or to enable one or more solar panels to be moved (e.g., flipped/turned) from one side to another side, which may enable increased solar power production for a longer duration of a day (e.g., as the sun is setting, solar panels having their surface facing away from the sun may be flipped/turned to re-face the sun, to generally track the sun). The moveable frame 350 may be customized and/or adjusted to any height, for example, to accommodate certain access to land covered by the solar panel array system 200 (e.g., grazing, irrigation, harvesting, seeding, etc.) during a time that the system 200 is configured for solar power generation over that land, and/or to accommodate different crops for different heights throughout a growing season. For example, the moveable frame 350 may comprise one or more vertical adjustment elements that may comprise at least one of: a spring-loaded notch coupled with a plurality of vertically spaced holes, a turn-dial coupled with gear, and/or a motor coupled with an electronic controller. The moveable frame 350 may comprise one or more add-on features that may assist with certain agricultural uses, such as hooks, pipes, and/or hoses. At least some moveable frames 350 (e.g., located at outer rows of the system 200) may comprise additional elements such as hitches and/or attachments for agricultural tools and/or equipment (e.g., seed spreaders, aerators, etc.). The moveable frame 350 may be configured with one or more gutters and/or other rainwater collection devices which may direct rainwater (e.g., collected from sliding across solar panels) to cisterns, rain barrels, and the like.

One or more solar panel arrays (e.g., 211, 311) may comprise one or more attachments configured to facilitate movement of the respective solar panel array(s) (e.g., either separately or in combination with movement of a plurality of solar panel arrays). The one or more attachments may comprise, for example, at least one of a tractor pull/hitch, a cable, or a motor. For example, solar panel arrays 211/311 that may be relatively shorter (and, as a result, lighter) may be moved manually and/or via a crank (e.g., powered manually as a manual crank and/or an electrical crank powered via one or more electrical and/or hydraulic source(s), and/or the like) and/or pulley system. Solar panel arrays 211/311 that may be relatively longer (and, as a result, heavier) may be moved using an electrical motor and/or pushed/pulled by a tractor and/or other vehicle. In at least some examples, such as for significantly heavy solar panel arrays 211/311, a cable may be used/installed, such as next to at least one of the rails 241, whereby each solar panel array 211/311 may be (e.g., temporarily) connected to the cable that may further be coupled to an engine that may pull the cable, along with any connected solar panel array(s) 211/311, to the desired first/second/N$^{th}$ position.

Figures 4A, 4B:
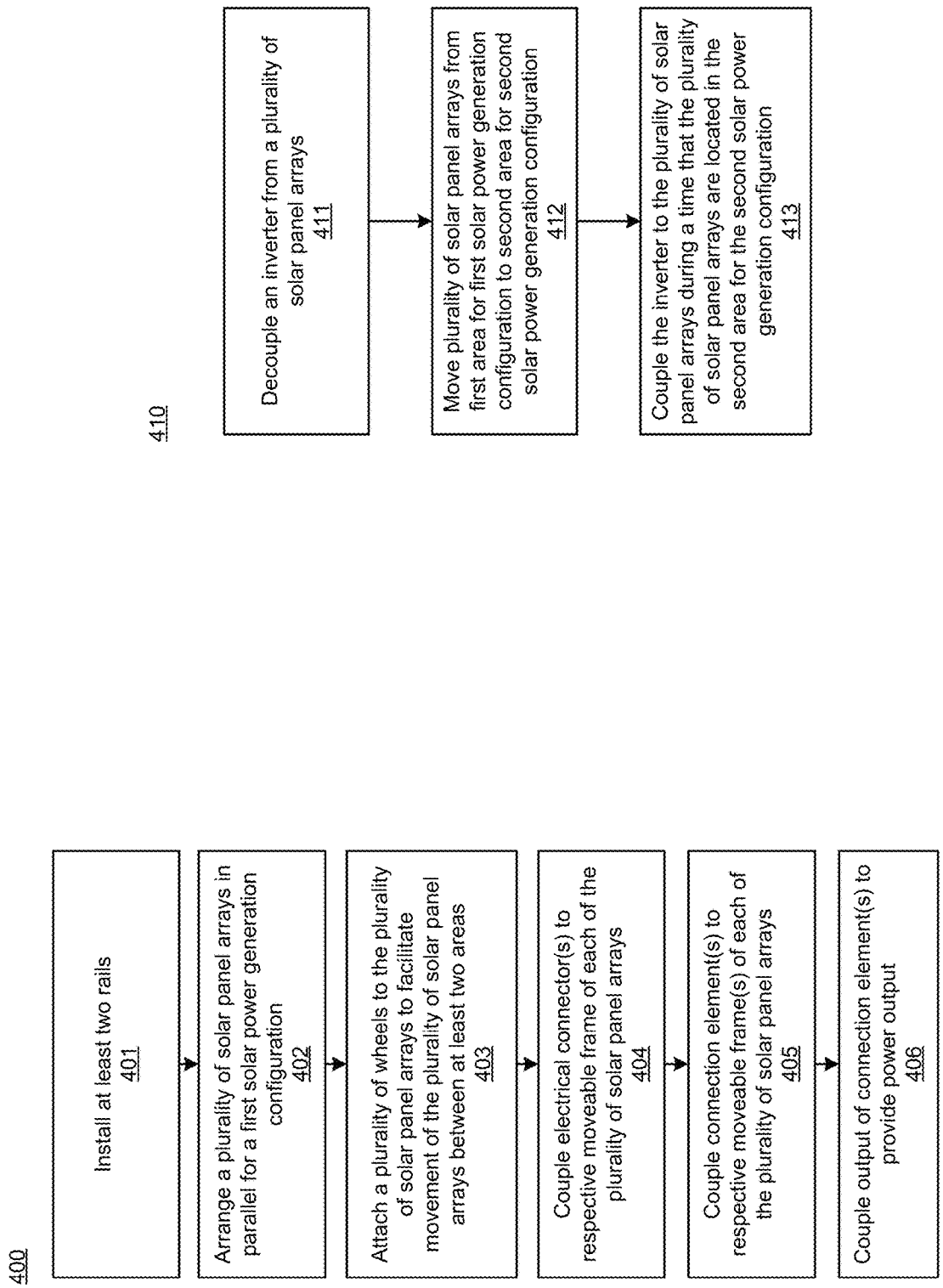
FIG. 4A shows an example method for installing and/or using a multi-position solar panel array system.
FIG. 4B shows an example method for moving solar panel arrays in a multi-position solar panel array system.

FIG. 4A shows an example method 400 for installing and/or using a multi-position solar panel array system. The multi-position solar panel array system may comprise the solar panel system 200 described herein with respect to FIGS. 2A, 2B, and 2C. The multi-position solar panel array system may comprise one or more solar panel arrays 211 and/or 311 described and shown with respect to FIG. 2 and/or FIG. 3. The method 400 may comprise, at step 401, installing, along a surface, at least two rails. The at least two rails may comprise a first rail and a second rail that are each at least twice as long as a length of a first two-dimensional region and that are configured to support a plurality of solar panel arrays. The installing may comprise arranging the first rail and the second rail in parallel to each other. The installing may comprise separating the first rail and the second rail from each other by at least a width of the two-dimensional region. At step 402, the method 400 may comprise arranging a plurality of solar panel arrays in parallel for a first solar power generation configuration. The plurality of solar panel arrays may be arranged to fit collectively within the first two-dimensional region. The first two-dimensional region may comprise an area defined by the length and the width. Each solar panel array, of the plurality of solar panel arrays, may comprise a moveable frame and a plurality of solar panels mounted on the moveable frame along at least a portion of the width of the first two-dimensional region. At step 403, the method may comprise attaching a plurality of wheels to the plurality of solar panel arrays. The attaching may comprise attaching a first wheel on a first side of the moveable frame and resting the first wheel on the first rail to facilitate movement of the moveable frame along the first rail from the first two-dimensional region for the first solar power generation configuration to a second two-dimensional region for a second solar power generation configuration. In at least some examples, no portion of the second two-dimensional region overlaps with the first two-dimensional region. In at least some other examples, the first two-dimensional region may at least partially overlap with the second two-dimensional region. The attaching may also comprise attaching a second wheel on a second side of the moveable frame and resting the second wheel on the second rail to facilitate movement of the moveable frame along the second rail from the first two-dimensional region to the second two-dimensional region. At step 404, the method 400 may comprise coupling at least one electrical connector to a respective moveable frame of each of the plurality of solar panel arrays to facilitate disconnection of electrical power prior to movement of the respective solar panel array and to facilitate reconnection of electrical power after movement of the respective solar panel array. At step 405, the method may comprise coupling one or more connection elements to a respective one or more moveable frame of a respective one or more solar panel arrays. At step 406, the method 400 may comprise coupling an output of the one or more connection elements to provide a power output. The coupling may comprise coupling an output of the one or more connection elements to an inverter for providing the power output. Additionally or alternatively, the coupling may comprise coupling an output of the one or more connection elements to off-array wiring which may (ultimately) be coupled to an inverter, a battery, or directly into equipment such as machinery or lighting (e.g., that may be powered by electricity generated by the solar panel array system). Off-array wiring may comprise wiring at a location other than on a solar panel array, such as nearby a solar panel array or at a remote location such as a home or other building that may use electricity generated by the solar panel array system. One or more of steps 401-406 may be performed in a different order, and/or may not be performed. Additionally or alternatively, other steps may be performed before, after, or during (e.g., as part of or in parallel with) any of the steps 401-406 of the method 400, including, for example, any operation described herein. The installation and/or using method 400 may yield a multi-position solar panel array system such that a plurality of solar panel arrays may be moved between at least two mutually exclusive areas.

FIG. 4B shows an example method 410 for moving solar panel arrays in a multi-position solar panel array system. The multi-position solar panel array system may comprise the solar panel system 200 described herein with respect to FIGS. 2A, 2B, and 2C. The multi-position solar panel array system may comprise one or more solar panel arrays 211 and/or 311 described and shown with respect to FIG. 2 and/or FIG. 3. The method 410 may be performed, for example, after installation of a multi-position solar panel array system according to the method 400 described with respect to FIG. 4A. The method 410 may comprise, at step 411, decoupling an inverter from a plurality of solar panel arrays. The decoupling may be during a time that the plurality of solar panel arrays are located in a first two-dimensional region/area for a first solar power generation configuration. At step 412, the method 410 may comprise moving the plurality of solar panel arrays from the first two-dimensional region/area for the first solar power generation configuration to a second two-dimensional region/area for a second solar power generation configuration. The first two-dimensional region/area for the first solar power generation configuration may be mutually exclusive to (non-overlapping with) the second two-dimensional region/area for the second solar power generation configuration. Alternatively, the first two-dimensional region/area for the first solar power generation configuration may at least partially overlap with the second two-dimensional region/area for the second solar power generation configuration. At step 413, the method 410 may comprise coupling the inverter to the plurality of solar panel arrays during a time that the plurality of solar panel arrays are located in the second two-dimensional region for the second solar power generation configuration.

Figure 5A:
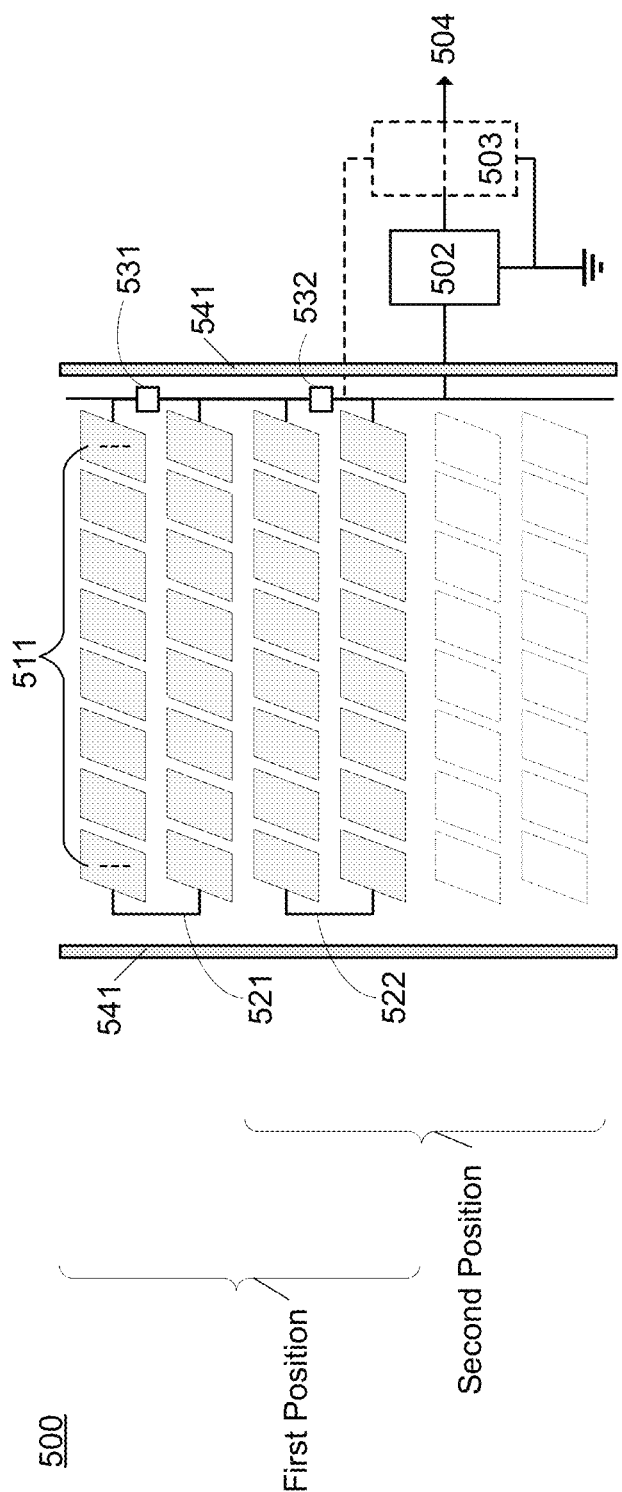
FIG. 5A shows an example of a multi-position solar panel array system with solar panel arrays located in a first position.
Figure 5B:
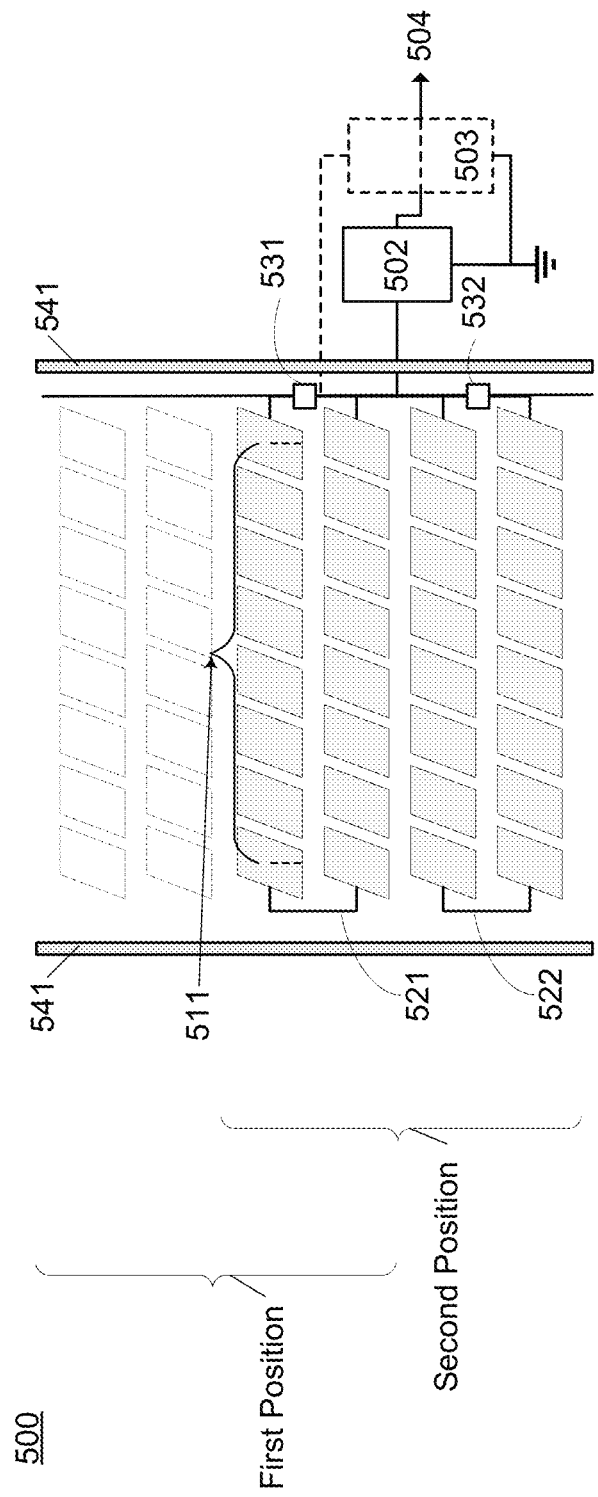
FIG. 5B shows an example of a multi-position solar panel array system with solar panel arrays located in a second position.

FIG. 5A and FIG. 5B both show examples of a multi-position solar panel array system. FIG. 5A shows an example of a multi-position solar panel array system 500 comprising solar panel arrays 511 located in a first position. As used herein, a "position" of a solar panel array 511 and/or of a plurality of solar panel arrays 511 may refer to a "region" and/or an "area" in which the solar panel arrays 511 are located to generate electrical power (e.g., a solar power generation configuration). FIG. 5B shows an example of the multi-position solar panel array system 500 with solar panel arrays 511 located in a second position. While shown with only two positions, the multi-position solar panel array system 500 may comprise solar panel arrays 511 located in any quantity of positions, including up to an $N^{th}$ position, where N may be any whole number greater than or equal to two. FIG. 5A and FIG. 5B may be collectively referred to herein as "FIG. 5" for ease of reference.

As shown in FIG. 5A, the multi-position solar panel array system 500 may comprise a plurality of solar panel arrays 511 that may be arranged for solar power generation in a first position, and that may be moveable along rails 541 to at least a second position (and/or up to an $N^{th}$ position) for solar power generation. As shown in FIG. 5A and FIG. 5B, the first position and the second position (and/or up to an $N^{th}$ position) comprises a two-dimensional area sufficient to fit the plurality of solar panel arrays 511 in a configuration sufficient for solar power generation. As described herein, being in a configuration sufficient for solar power generation corresponds to the solar panel arrays 511 being arranged so as to accommodate potentially being exposed to the sun (e.g., if the sun were to be present) in order to generate electrical power. Being in a solar power generation configuration is in contrast to being arranged in a position for storage, such as with at least some solar panels covering surface area of other solar panels in a manner that may reduce overall surface area of the solar panel arrays and/or that may reduce overall storage space (e.g., while potentially sacrificing power generation of at least some solar panels). In FIG. 5A, the solar panel arrays 511 are shown with shading in the first position to indicate that the solar panel arrays 511 are located in the first position in this example of FIG. 5.

At least some of the solar panels in the solar panel system 500 may be included in two or more positions, such that positions (e.g., the first position and the second position) may overlap. For example, FIG. 5 shows half of the solar panel arrays 511 (e.g., the two solar panel arrays shown as coupled via connection 522 and connection element 532) are within in both the first position and the second position. The second position is shown in FIG. 5A with dashed outlines of the bottom-most two rows of solar panel arrays and with solid lines and shaded areas of the solar panels of the top-most two rows of solar panels to show that, when the bottom-most two rows of solar panel arrays 511 from the first position are moved to the second position, the bottom half of the area of the second position can accommodate those solar panel arrays (e.g., the two solar panel arrays shown as coupled via connection 522 and connection element 532) in a configuration sufficient for solar power generation (e.g., sufficient length, width, panel area, panel spacing, array spacing, etc.).

FIG. 5B shows the solar panel arrays 511 in the second position. For example, the solar panel arrays 511 may be moved from the first position (such as shown in FIG. 5A) to the second position (such as shown in FIG. 5B). As shown in this second position, the solar panel arrays 511 are arranged for solar power generation. The solar panel arrays 511 are shown with shading in the second position to indicate that the solar panel arrays 511 are located in the second position in this example of FIG. 5B. The first position is shown in FIG. 5B with dashed outlines of the top-most two rows of solar panel arrays and with solid lines and shaded areas of the solar panels of the bottom-most two rows of solar panels to show that, when the top-most two rows of solar panel arrays 511 from the second position are moved to the first position, the top half of the area of the first position can accommodate those solar panel arrays (e.g., the two solar panel arrays shown as coupled via connection 521 and connection element 531) in a configuration sufficient for solar power generation (e.g., sufficient length, width, panel area, panel spacing, array spacing, etc.).

While FIG. 5 is shown with a total area that may accommodate up to six rows of solar panels (e.g., up to six solar panel arrays 511), and with a total of four rows of solar panels (e.g., four solar panel arrays 511) that are movable between different positions, the solar power system 500 may accommodate any quantity of rows of solar panels, and with any quantity of rows of solar panels that may be moveable between different positions. Additionally or alternatively, while FIG. 5 is shown with half of the first position overlapping with the second position, and with half of the second position overlapping with the first position, any quantity of a first position may overlap with any quantity of a second (or up to an $N^{th}$ position) such that multiple positions may include at least some solar panels that are in a configuration sufficient for solar power generation in at least some other position.

With respect to FIG. 5A and FIG. 5B, the plurality of solar panel arrays 511 may correspond to the solar panel arrays 111 described with respect to FIG. 1, the solar panel arrays 211 described with respect to FIG. 2, and/or the solar panel array 311 described with respect to FIG. 3. Any of the features described with respect to the solar panel system 100 described with respect to FIG. 1 may correspond to elements in the solar panel system 500. Any of the features described with respect to the solar panel system 200 described with respect to FIG. 2 may correspond to elements in the solar panel system 500. For example, inverter 102, battery 103, and/or output 104 in the solar power system 100, and/or the inverter 202, battery 203, and/or power output 204 in the solar power system 200, may correspond to similarly numbered inverter 502, battery 503, and/or output 504 in the solar power system 500, and descriptions of such elements and/or features regarding FIG. 1 and FIG. 2 are incorporated by reference here in the solar power system 500 of FIG. 5A and FIG. 5B. Similarly, the solar panel arrays 511 may be connected in series or in parallel via one or more connections 521 and/or 522, via one or more connection elements 531 and/or 532, and/or via other electrical equipment, such as described with respect to the connections 221 and/or 222, the connection elements 231 and/or 232, and/or the other electrical equipment in FIG. 2, incorporated by reference here in the solar power system 500 of FIG. 5A and FIG. 5B. At least some of the connections may comprise underground electrical conduit. For example, a main combiner box, such as the connection element 532, may be coupled to the inverter 502 via underground electrical conduit. The underground electrical conduit may be installed underneath or adjacent (e.g., parallel to) at least one of the rails 541 (e.g., the rail 541 closest to the inverter 502). The underground conduit may extend approximately as long as the rails 541, or at least as long as a distance between a location of a main combiner box when the main combiner box is located at the first portion and a location of the main combiner box when the main combiner box is located at the $N^{th}$ portion.

Wiring/cables/connector(s) that couple the inverter 502 to a main connection element (e.g., connection element 532) may be disconnected to allow movement of the solar panel arrays 511 to a different position (e.g., first/second position). Wiring/cables/connector(s) may be recoupled to the inverter 502 after movement of the plurality of solar panel arrays 511 to the different position. In this manner, the one or more connection elements (e.g., 531 and/or 532), including the main connection element, may move along with the plurality of solar panel arrays 511, whereas the inverter 502 may remain stationary. In at least some examples, one or more connection elements may be stationary. For example, one or more stationary connection elements may be coupled/decoupled to the solar panel arrays 511 after/before movement of the solar panel arrays. The inverter 502 may be located at a fixed location, approximately in between the first position and the second position (or in between a first position and an $N^{th}$ position if N is greater than two), and may be coupled to an electric utility grid and/or a home/building that may use electricity generated by the solar power system 500 at the power output 504. As described herein, power may be transferred from a main connection element to the inverter 502 within electrical conduit (e.g., underground electrical conduit) which may provide increase safety around the solar power system 500, for example, by reducing potential exposure of humans and/or animals to potentially dangerous levels of power. Such a configuration may additionally facilitate movement of the plurality of solar panel arrays 511 between the first/second positions, for example, by avoiding a need to include excess wiring/cables above ground that corresponds to the length of the rails 541. As described further herein, the solar panel array system 500 may cover land comprising any amount of area, and the coverage of the solar panel array system may be extended to any additional size, for example, by extending the rails 541 and adding additional electrical conduit to couple the inverter 502 to a main connection element at its further location from the inverter 502. Additionally or alternatively, while shown as a single inverter in the system 500, the inverter 502 may comprise a plurality of inverters. In such a system comprising a plurality of inverters as the inverter 502, an inverter may be located adjacent and/or nearby one or more positions of the system 500. For example, an inverter may be located within or nearby a plurality of (e.g., each of) the first, second, and/or $N^{th}$ positions. Additional electrical equipment may be included in the system 500, such as fuses, transformers, switches, and the like, to facilitate safe and reliable transfer and conversion of electrical power from the solar panels of the solar panel arrays 511 to the power output 504.

The plurality of solar panel arrays 511 may comprise any quantity of solar panel arrays. Any of the plurality of solar panel arrays 511 may comprise any quantity of solar panels, such as the solar panels 101 described with respect to FIG. 1 incorporated by reference here in the solar power system 500 of FIG. 5A and FIG. 5B. At least some solar panels in the plurality of solar panel arrays 511 may be spaced apart from an adjacent solar panel within an array of solar panels, such as shown in FIG. 5A and FIG. 5B, or may be placed adjacent to another solar panel without a noticeable space/gap between the solar panels such as shown in FIG. 1. The plurality of solar panel arrays 511 may be moved one array at a time, multiple arrays at a time, and/or all of the plurality of solar panel arrays 511 together.

Rails 541 may facilitate movement of the plurality of solar panel arrays 511 between the first position, the second position, and/or an $N^{th}$ position. Each of the plurality of solar panel arrays 511 may comprise a plurality of solar panels 101 mounted on a moveable frame (not shown in FIG. 5), described and shown further herein such as with respect to FIG. 3. The moveable frame may be mounted on the rails 541.

A system for multi-position solar panel arrays may be provided as described herein. The system may comprise a plurality of moveable frames, at least two rails, and a plurality of wheels. The plurality of moveable frames, when arranged in parallel for a first solar power generation configuration, may be configured to fit collectively within a first two-dimensional region comprising a width and a length. Each moveable frame, of the plurality of moveable frames, may be configured to support a plurality of solar panels along at least a portion of the width of the first two-dimensional region. The at least two rails may comprise a first rail and a second rail. The first rail and the second rail each may be longer than the length of the first two-dimensional region. The at least two rails may each be at least twice as long as the length of the first two-dimensional region. The first rail and the second rail may be configured to support the plurality of moveable frames. The first rail and the second rail may be configured to be arranged in parallel to each other. The first rail and the second rail may be configured to be separated from each other by at least the width of the two-dimensional region. The plurality of wheels may comprise a first set of wheels and a second set of wheels. The first set of wheels may be configured to engage the first rail and to facilitate movement of the plurality of moveable frames along the first rail from the first two-dimensional region for the first solar power generation configuration to a second two-dimensional region first for a second solar power generation configuration. No portion of the second two-dimensional region may overlap with the first two-dimensional region. Alternatively, at least some portion of the second two-dimensional region may overlap with the first two-dimensional region. The second set of wheels may be configured to engage the second rail and to facilitate movement of the plurality of moveable frames along the second rail from the first two-dimensional region to the second two-dimensional region. The system may further comprise a plurality of solar panel arrays, wherein each solar panel array, of the plurality of solar panel arrays, may comprise: one of the plurality of moveable frames; and a quantity of solar panels corresponding to the plurality of solar panels. The system may further comprise an inverter that may be configured to convert power from direct current to alternating current both when the plurality of moveable frames are located in the first two-dimensional region and when the plurality of moveable frames are located in the second two-dimensional region. The system may further comprise a plurality of combiner boxes, wherein each combiner box, of the plurality of combiner boxes, may be configured to be mounted on one of the plurality of moveable frames and may be configured to combine direct current and to provide the combined direct current to the inverter. The system may further comprise at least one wheel lock configured to: resist movement of at least one moveable frame of the plurality of moveable frames, when the at least one wheel lock is engaged; and disable resistance of movement of the at least one moveable frame of the plurality of moveable frames, when the at least one wheel lock is disengaged. The system may further comprise a plurality of electrical connectors, wherein at least one electrical connector, of the plurality of electrical connectors, may be configured to be coupled to a respective at least one moveable frame of the plurality of moveable frames to facilitate disconnection of electrical power prior to movement of the respective at least one moveable frame and to facilitate reconnection of electrical power after movement of the respective at least one moveable frame. The system may further comprise an attachment configured to facilitate movement of the plurality of moveable frames, wherein the attachment comprises at least one of: a tractor pull, a cable, or a motor.

A system for multi-position solar panel arrays may be provided as described herein. The system may comprise a plurality of solar panel arrays and at least two rails. The plurality of solar panel arrays may, when arranged in parallel for a first solar power generation configuration, may be configured to fit collectively within a first two-dimensional region comprising a width and a length. Each solar panel array, of the plurality of solar panel arrays, may comprise: a moveable frame; and a plurality of solar panels mounted on the moveable frame along at least a portion of the width of the first two-dimensional region. The at least two rails may comprise a first rail and a second rail. The first rail and the second rail each may be at least twice as long as the length of the first two-dimensional region and may be configured to support the plurality of solar panel arrays. The first rail and the second rail may be configured to be arranged in parallel to each other. The first rail and the second rail may be configured to be separated from each other by at least the width of the first two-dimensional region. The first rail and the second rail may facilitate movement of the plurality of solar panel arrays from the first two-dimensional region for the first solar power generation configuration to a second two-dimensional region for a second solar power generation configuration. No portion of the second two-dimensional region may overlap with the first two-dimensional region. The system may further comprise an inverter that may be configured to convert power from direct current to alternating current both when the plurality of solar panel arrays are located in the first two-dimensional region and when the plurality of solar panel arrays are located in the second two-dimensional region. The system may further comprise a plurality of combiner boxes. Each combiner box, of the plurality of combiner boxes, may be configured to be mounted on one of the plurality of solar panel arrays and may be configured to combine direct current and to provide the combined direct current to the inverter. The system may further comprise at least one lock configured to: resist movement of at least one solar panel array of the plurality of solar panel arrays, when the at least one lock is engaged; and disable resistance of movement of the at least one solar panel array of the plurality of solar panel arrays, when the at least one lock is disengaged. The system may further comprise a plurality of electrical connectors. At least one electrical connector, of the plurality of electrical connectors, may be configured to be coupled to a respective at least one solar panel array of the plurality of solar panel arrays to facilitate disconnection of electrical power prior to movement of the respective at least one solar panel array and to facilitate reconnection of electrical power after movement of the respective at least one solar panel array. The system may further comprise an attachment configured to facilitate movement of the plurality of moveable frames, wherein the attachment comprises at least one of: a tractor pull, a cable, or a motor. The system may further comprise a friction reducing element for facilitating movement of the plurality of solar panel arrays between the first two-dimensional region and the second two-dimensional region. The friction reducing element may comprise at least one of: a wheel, a bearing, or a chain coupled to one or more gears. The moveable frame may comprise a vertical adjustment element configured to enable movement of the plurality of solar panels in a vertical direction to be either further from, or closer to, ground level. The vertical adjustment element may comprise at least one of: a spring-loaded notch coupled with a plurality of vertically spaced holes, a turn-dial coupled with gear, or a motor coupled with an electronic controller.

Various aspects described herein may be embodied as a system, a method, an apparatus, or as one or more computer-readable media storing computer-executable instructions (e.g., such as instructions for solar panel rotation/tracking and/or automated movement of solar panels and/or solar panel arrays). Aspects of the disclosure have been described in terms of example embodiments. Other embodiments, modifications, and/or variations within the scope and spirit of the appended claims will be evident to persons of ordinary skill in the art. For example, one or more of the steps depicted in the example figures may be performed in a different order, one or more steps described with respect to one figure may be used in combination with one or more steps described with respect to another figure, and/or one or more described steps may be optional.

The invention claimed is:

1. A multi-position solar panel array system comprising:
a plurality of moveable frames that, when arranged in parallel for a first stationary solar power generation configuration, are configured to fit collectively within a first two-dimensional region comprising a width and a length, wherein each moveable frame, of the plurality of moveable frames, is configured to support a plurality of solar panels along at least a portion of the width of the first two-dimensional region;
at least two rails, comprising a first rail and a second rail, that are longer than the length of the first two-dimensional region and that are configured to support the plurality of moveable frames, wherein the first rail and the second rail are configured to be arranged in parallel to each other; and
a plurality of wheels comprising:
a first set of wheels configured to engage the first rail and to facilitate movement of the plurality of moveable frames along the first rail from the first two-dimensional region for the first stationary solar power generation configuration to a second two-dimensional region for a second stationary solar power generation configuration; and
a second set of wheels configured to engage the second rail and to facilitate movement of the plurality of moveable frames along the second rail from the first two-dimensional region to the second two-dimensional region.

2. The multi-position solar panel array system of claim 1, further comprising a plurality of solar panel arrays, wherein each solar panel array, of the plurality of solar panel arrays, comprises:
  one of the plurality of moveable frames; and
  a quantity of solar panels corresponding to the plurality of solar panels.

3. The multi-position solar panel array system of claim 1, further comprising an inverter configured to convert power from direct current to alternating current both when the plurality of moveable frames is located in the first two-dimensional region and when the plurality of moveable frames is located in the second two-dimensional region.

4. The multi-position solar panel array system of claim 1, wherein the at least two rails are each at least twice as long as the length of the first two-dimensional region, and wherein no portion of the second two-dimensional region overlaps with the first two-dimensional region.

5. The multi-position solar panel array system of claim 1, further comprising at least one wheel lock configured to:
  resist movement of at least one moveable frame of the plurality of moveable frames, when the at least one wheel lock is engaged; and
  disable resistance of movement of the at least one moveable frame of the plurality of moveable frames, when the at least one wheel lock is disengaged.

6. The multi-position solar panel array system of claim 1, further comprising a plurality of electrical connectors, wherein at least one electrical connector, of the plurality of electrical connectors, is configured to be coupled to a respective at least one moveable frame of the plurality of moveable frames to facilitate disconnection of electrical power prior to movement of the respective at least one moveable frame and to facilitate reconnection of electrical power after movement of the respective at least one moveable frame.

7. The multi-position solar panel array system of claim 1, further comprising an attachment configured to facilitate movement of the plurality of moveable frames, wherein the attachment comprises at least one of:
  a tractor pull;
  a cable; or
  a motor.

8. A multi-position solar panel array system comprising:
  a plurality of solar panel arrays that, when arranged in parallel for a first stationary solar power generation configuration, are configured to fit collectively within a first two-dimensional region comprising a width and a length, wherein each solar panel array, of the plurality of solar panel arrays, comprises:
    a moveable frame; and
    a plurality of solar panels mounted on the moveable frame along at least a portion of the width of the first two-dimensional region;
  at least two rails, comprising a first rail and a second rail, that are each at least twice as long as the length of the first two-dimensional region and that are configured to support the plurality of solar panel arrays, wherein:
    the first rail and the second rail are configured to be arranged in parallel to each other; and
    the first rail and the second rail facilitate movement of the plurality of solar panel arrays from the first two-dimensional region for the first stationary solar power generation configuration to a second two-dimensional region for a second stationary solar power generation configuration, wherein no portion of the second two-dimensional region overlaps with the first two-dimensional region.

9. The multi-position solar panel array system of claim 8, further comprising an inverter configured to convert power from direct current to alternating current both when the plurality of solar panel arrays is located in the first two-dimensional region and when the plurality of solar panel arrays is located in the second two-dimensional region.

10. The multi-position solar panel array system of claim 9, further comprising:
  a plurality of combiner boxes, wherein each combiner box, of the plurality of combiner boxes, is configured to be mounted on one of the plurality of solar panel arrays and is configured to combine direct current and to provide the combined direct current to the inverter.

11. The multi-position solar panel array system of claim 8, further comprising at least one lock configured to:
  resist movement of at least one solar panel array of the plurality of solar panel arrays, when the at least one lock is engaged; and
  disable resistance of movement of the at least one solar panel array of the plurality of solar panel arrays, when the at least one lock is disengaged.

12. The multi-position solar panel array system of claim 8, further comprising a plurality of electrical connectors, wherein at least one electrical connector, of the plurality of electrical connectors, is configured to be coupled to a respective at least one solar panel array of the plurality of solar panel arrays to facilitate disconnection of electrical power prior to movement of the respective at least one solar panel array and to facilitate reconnection of electrical power after movement of the respective at least one solar panel array.

13. The multi-position solar panel array system of claim 8, further comprising an attachment configured to facilitate movement of the moveable frame, wherein the attachment comprises at least one of:
  a tractor pull;
  a cable; or
  a motor.

14. The multi-position solar panel array system of claim 8, further comprising a friction reducing element for facilitating movement of the plurality of solar panel arrays between the first two-dimensional region and the second two-dimensional region, wherein the friction reducing element comprises at least one of:
  a wheel;
  a bearing; or
  a chain coupled to one or more gears.

15. The multi-position solar panel array system of claim 8, wherein the moveable frame comprises a vertical adjustment element configured to enable movement of the plurality of solar panels in a vertical direction to be either further from, or closer to, ground level, and wherein the vertical adjustment element comprises at least one of:
  a spring-loaded notch coupled with a plurality of vertically spaced holes;
  a turn-dial coupled with gear; or
  a motor coupled with an electronic controller.

16. A method comprising:
  arranging a plurality of solar panel arrays in parallel for a first stationary solar power generation configuration, wherein the plurality of solar panel arrays fit collectively within a first two-dimensional region comprising a width and a length, and wherein each solar panel array, of the plurality of solar panel arrays, comprises:
    a moveable frame; and a plurality of solar panels mounted on the moveable frame along at least a portion of the width of the first two-dimensional region;

installing along a surface at least two rails, comprising a first rail and a second rail, that are longer than the length of the first two-dimensional region and that are configured to support the plurality of solar panel arrays, wherein the installing comprises:

arranging the first rail and the second rail in parallel to each other; and separating the first rail and the second rail from each other by a distance; and attaching a plurality of wheels to the plurality of solar panel arrays, wherein the attaching comprises:

attaching a first wheel on a first side of the moveable frame and resting the first wheel on the first rail to facilitate movement of the moveable frame along the first rail from the first two-dimensional region for the first stationary solar power generation configuration to a second two-dimensional region for a second stationary solar power generation configuration, wherein no portion of the second two-dimensional region overlaps with the first two-dimensional region; and attaching a second wheel on a second side of the moveable frame and resting the second wheel on the second rail to facilitate movement of the moveable frame along the second rail from the first two-dimensional region to the second two-dimensional region.

17. The method of claim 16, further comprising coupling an inverter to the plurality of solar panel arrays to convert power from direct current to alternating current both when the moveable frame of each of the plurality of solar panel arrays is located in the first two-dimensional region and when the moveable frame of each of the plurality of solar panel arrays is located in the second two-dimensional region.

18. The method of claim 17, further comprising:

coupling a first combiner box to the moveable frame; and coupling a plurality of combiner boxes, comprising the first combiner box, to the inverter to provide combined direct current to the inverter.

19. The method of claim 16, further comprising:

coupling at least one electrical connector to the moveable frame to facilitate disconnection of electrical power prior to movement of the moveable frame and to facilitate reconnection of electrical power after movement of the moveable frame.

20. The method of claim 16, further comprising:

decoupling an inverter from the plurality of solar panel arrays during a time that the plurality of solar panel arrays is located in the first two-dimensional region for the first stationary solar power generation configuration;

moving the plurality of solar panel arrays from the first two-dimensional region for the first stationary solar power generation configuration to the second two-dimensional region for the second stationary solar power generation configuration; and coupling the inverter to the plurality of solar panel arrays during a time that the plurality of solar panel arrays is located in the second two-dimensional region for the second stationary solar power generation configuration.

* * * * *